US005963307A

United States Patent [19]

Eshelman et al.

[11] Patent Number: 5,963,307

[45] Date of Patent: Oct. 5, 1999

[54] COLOR PHOTOTHERMOGRAPHY

[75] Inventors: Lyn M. Eshelman, Penfield; Timothy W. Stoebe, Victor, both of N.Y.

[73] Assignee: Eastman Kodak Company, Rochester, N.Y.

[21] Appl. No.: 09/045,382

[22] Filed: Mar. 20, 1998

[51] Int. Cl.$^{6}$ .............................. G03B 27/00; G03C 5/16

[52] U.S. Cl. ............................................ 355/402; 430/348

[58] Field of Search ..................................... 355/402, 404, 355/27–29, 40–43, 77; 430/348, 350, 351, 566, 567, 376, 375

[56] References Cited

U.S. PATENT DOCUMENTS

| | | | |
|---|---|---|---|
| 4,435,499 | 3/1984 | Reeves | 430/350 |
| 4,439,520 | 3/1984 | Kofron et al. | 430/434 |
| 4,504,568 | 3/1985 | Clark et al. | 430/203 |
| 4,880,726 | 11/1989 | Shiba et al. | 430/376 |
| 5,455,146 | 10/1995 | Nishikawa et al. | 430/385 |
| 5,468,587 | 11/1995 | Bailey et al. | 430/203 |
| 5,478,704 | 12/1995 | Taniguchi | 430/435 |
| 5,817,449 | 10/1998 | Nakamura | 430/399 |

OTHER PUBLICATIONS

Research Disclosure, Item 17029, vol. 170, Jun. 1978.

*Primary Examiner*—Safet Metjahic
*Assistant Examiner*—Hung Henry Nguyen
*Attorney, Agent, or Firm*—Carl O. Thomas

[57] ABSTRACT

A camera-speed color photothermographic imaging method is disclosed. A photothermographic film is employed that contains a photographically responsive, thermally developable panchromatically sensitized emulsion layer unit capable of concurrently forming silver and dye image densities. The emulsion layer unit is exposed in three separate image capture areas to blue, green or red light received from the photographic subject to create latent images of blue, green and red light exposure. The photothermographic element is thermally processed to produce images of the same hue in each of the three separate image capture areas. The images of blue, green and red light exposures are then converted into a corresponding additive or subtractive primary hue, and integrated to provide a positive or negative color image of the photographic subject.

7 Claims, 1 Drawing Sheet

Element I

COLOR PHOTOTHERMOGRAPHY

FIELD OF THE INVENTION

The invention relates to a method of obtaining color images from a photothermographic element that produces images of a single hue.

BACKGROUND

In the most widely used (main-stream) form of color photography a blue recording yellow image dye-forming layer unit, a green recording magenta image dye-forming layer unit, and a red recording cyan image dye-forming layer unit are coated as superimposed layers on a photographic film support to form a color photographic film. With the color film mounted in a camera, light from a photographic subject is directed through a lens to the topmost of the superimposed layers and penetrates each of the layer units in the same area of the film. Differentially sensitized silver halide grains in the layer units cause three superimposed latent images to be formed, each representative of exposing light from a different one of the blue, green and red regions of the spectrum.

To obtain a viewable color image the film is processed in a sequence of processing baths, starting with a color developer. The latent image bearing silver halide grains are selectively reduced to silver by a color developing agent, which, in its resulting oxidized form, reacts with a dye-forming coupler to produce image dye. After development, the developed silver is reconverted to silver halide in a bleach bath, and the silver halide is then removed by in a fixing bath to render the color film light insensitive. Superimposed yellow, magenta and cyan dye images are left in the film at the conclusion of processing, corresponding to the image patterns of blue, green and red light exposure, respectively.

In most instances negative-working silver halide emulsions are employed, and the dye images are negative images. To obtain a viewable positive color image a color paper (having the same types of layer units described above, but coated on a white reflective support) is exposed by white light passing through the image bearing color film. Instead of exposing the color paper through the processed color film image, it is possible to retrieve the dye image information from the fully processed color film by scanning. This information can be stored in a digital computer and used in various ways—e.g., for viewing on a cathode ray tube (CRT) monitor or for controlling laser or photodiode exposure of a color paper. To produce a viewable image in the color paper, it is processed in a series of aqueous baths as described above.

It should be noted that the color film as typically used in a camera to create an original image of a photographic subject is an "image capture" film. Here subject motion and/or limited light availability can place high demands on imaging speed. On the other hand, the color paper is an "output" medium that produces an image from an image already captured. As an output medium color paper is exposed without subject motion and with controlled lighting. The standard practice is therefore to select output media of much lower imaging speeds than desired in most image capture films.

The high levels of internal amplification afforded by converting a latent image site on a silver halide grain formed by a few captured photons into thousands of dye molecules allows extremely high levels of imaging sensitivity to be attained in the color film. This, more than any other single factor, accounts for the widespread use of silver halide color film for image capture.

There are, however, many limitations and disadvantages of silver halide color films. One of the disadvantages that has been most vigorously addressed is the need to employ aqueous baths for processing. Color image transfer systems have been developed for integrating processing compositions into the film package. However, the reduction of image sharpness during dye image transfer has precluded the use of these systems in the overwhelming majority of photographic applications in which the color image is significantly enlarged for viewing. Attempts to produce acceptable viewable image sizes without enlargement have resulted in cameras for color image transfer systems being bulky and unattractive to users.

Photothermographic elements rely on light for latent image formation and uniform heating to produce a viewable image. While photothermographic elements eliminate aqueous processing baths, pronounced limitations have restricted their widespread use to black-and-white (silver) imaging. A summary of photothermographic element constructions is provided by *Research Disclosure*, Vol. 170, June 1978, Item 17029. *Research Disclosure* is published by Kenneth Mason Publications, Ltd., Dudley House, 12 North St., Emsworth, Hampshire P010 7DQ, England.

Photothermographic imaging systems are more complex than corresponding aqueous processed imaging systems. In a typical form an imaging layer unit contains (a) photosensitive silver halide grains formed in situ or ex situ, (b) an oxidation-reduction image forming combination comprising (i) a metallic salt or complex of an organic compound as an oxidizing agent and (ii) an organic reducing agent or developing agent, and (c) coating vehicle. Although latent image formation still relies on silver halide grains, the actual mechanism of image formation is quite different than in main-stream silver halide photography. In fact, relatively low imaging speeds have generally limited photothermographic elements to output imaging applications.

It has been recognized that photothermographic elements can be constructed to produce dye images, as illustrated by *Research Disclosure*, Item 17029, cited above, XV Color Materials. When a photothermographic film is constructed with three superimposed image dye-forming layer units, each of the layer units contains developed silver, formed either as a result of imaging or by the spontaneous reduction of silver halide to silver (i.e., fog and printout). To avoid high levels of minimum density superimposed on the image dye densities, the art has moved in the direction of transferring the dye image to a separate receiver. This eliminates only one of the limitations of photothermographic imaging while embracing all of the limitations of image transfer systems. Color photothermographic image transfer systems are illustrated by Clark et al U.S. Pat. No. 4,504,568 and Bailey et al U.S. Pat. No. 5,468,587.

All of the color imaging elements described above capable of replicating natural colors coat three superimposed image dye-forming layer units on a support. This arrangement, as well as employing three different image dye-forming materials to produce yellow, magenta and cyan dye images, has been considered essential to achieving acceptable natural color images. It is easily recognized that the coating of image dye-forming layers in a superimposed relationship degrades the sharpness of the dye image in the underlying layer units. Also, not only is a minimum of three layers required to be coated, but in most preferred constructions interlayers further increase the number of layers that must be coated.

Tabular grain emulsions are well known for use in mainstream photography, as illustrated by Kofron et al U.S. Pat. No. 4,439,520. Reeves U.S. Pat. No. 4,435,499 demonstrated increased development efficiency for tabular grain emulsions in photothermographic elements. Although occasionally mentioned as a possible alternative grain selection for photothermographic elements, tabular grain emulsions have not been identified as the silver halide emulsions of choice for photothermographic elements.

RELATED PATENT APPLICATION

Levy et al U.S. Pat. No. 5,840,475 discloses photothermographic elements containing a high chloride {100} tabular grain emulsion, a dye-forming coupler, silver 3-amino-5-benzylmercapto-1,2,4-triazole, and a gelatin vehicle. Photothermographic elements containing three superimposed imaging layer units are disclosed.

SUMMARY OF THE INVENTION

In one aspect this invention is directed to a method of creating a color image of a photographic subject comprising (i) mounting in a camera photothermographic film comprised of a support and, coated on the support, a photographically responsive, thermally developable panchromatically sensitized emulsion layer unit containing (a) radiation-sensitive silver halide grains, at least 50 percent of the projected area of the grains being accounted for by tabular grains, (b) a plurality of spectral sensitizing dyes adsorbed to the surface of the radiation-sensitive silver halide grains chosen to provide light sensitivity in the blue, green and red portions of the spectrum, (c) a light-insensitive, reducible source of silver, (d) a developing agent, (e) a compound capable of providing a dye image upon reacting with oxidized developing agent, and (f) a hydrophilic colloid vehicle, (ii) exposing the emulsion layer unit in a first image capture area to blue light received from the photographic subject to create a latent image of blue light exposure, (iii) exposing the emulsion layer unit in a second image capture area to green light received from the photographic subject to create a latent image of green light exposure, (iv) exposing the emulsion layer unit in a third image capture area to red light received from the photographic subject to create a latent image of red light exposure, (v) thermally processing the photothermographic element to produce images of the same hue in each of the first, second and third image capture areas, (vi) converting each of the images of blue, green and red light exposures into a corresponding additive or subtractive primary hue, and (vii) integrating the primary hue images to provide a positive or negative color image of the photographic subject.

The invention achieves a combination of advantages never previously realized in a single photographic system capable of creating an image of a photographic subject and transforming that image into a viewable form.

A novel image capture photothermographic film is provided that requires no processing baths to produce retained images of blue, green and red light exposure. The photothermographic film requires only a single emulsion layer unit. This eliminates the disadvantages of the superimposed placement of blue, green and red emulsion layer units in conventional color photothermographic elements. Further, a dye image of only a single hue is required to produce separate image records of blue, green and red light exposures. This eliminates any requirement of multiple image dye formers and eliminates any requirement of interlayers containing oxidized developing agent scavengers (a.k.a. antistain agents) to segregate dye image formers.

The side-by-side-by-side relationship of the separate retained blue, green and red exposure records in a single emulsion layer unit facilitates separate scanning of each exposure record. Since the scanning beam penetrates only one exposure record instead of three superimposed exposure records, there is no chance of unwanted attenuation of the scanning beam occurring attributable to the two remaining exposure records, as occurs when layer units are superimposed.

In the final image that is produced for viewing, higher color saturation of each of the color records is clearly observed. Image discrimination, the difference between maximum and minimum density, is increased, and minimum density is decreased. Sharper dye images are also obtained. The blue, green and red exposure records can be easily translated into a final color image for viewing on a CRT monitor in digital form or viewing as a conventional color paper image.

By creating in the photothermographic film separate blue, green and red exposure records that rely on a combination of image dye and developed silver densities it has been found that better signal to noise relationships and better image discrimination are realized than when images of the same maximum density are produced using developed silver alone to create image densities.

DESCRIPTION OF PREFERRED EMBODIMENTS

Figure 1:
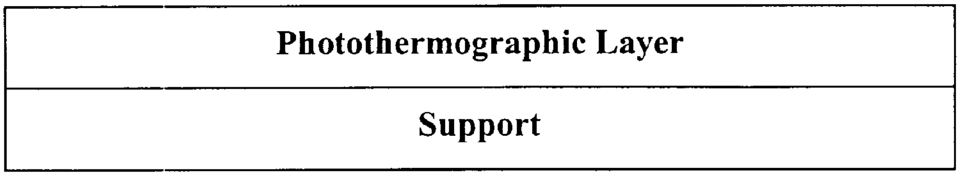
FIG. 1 is a schematic diagram of Element I.
Figure 2:
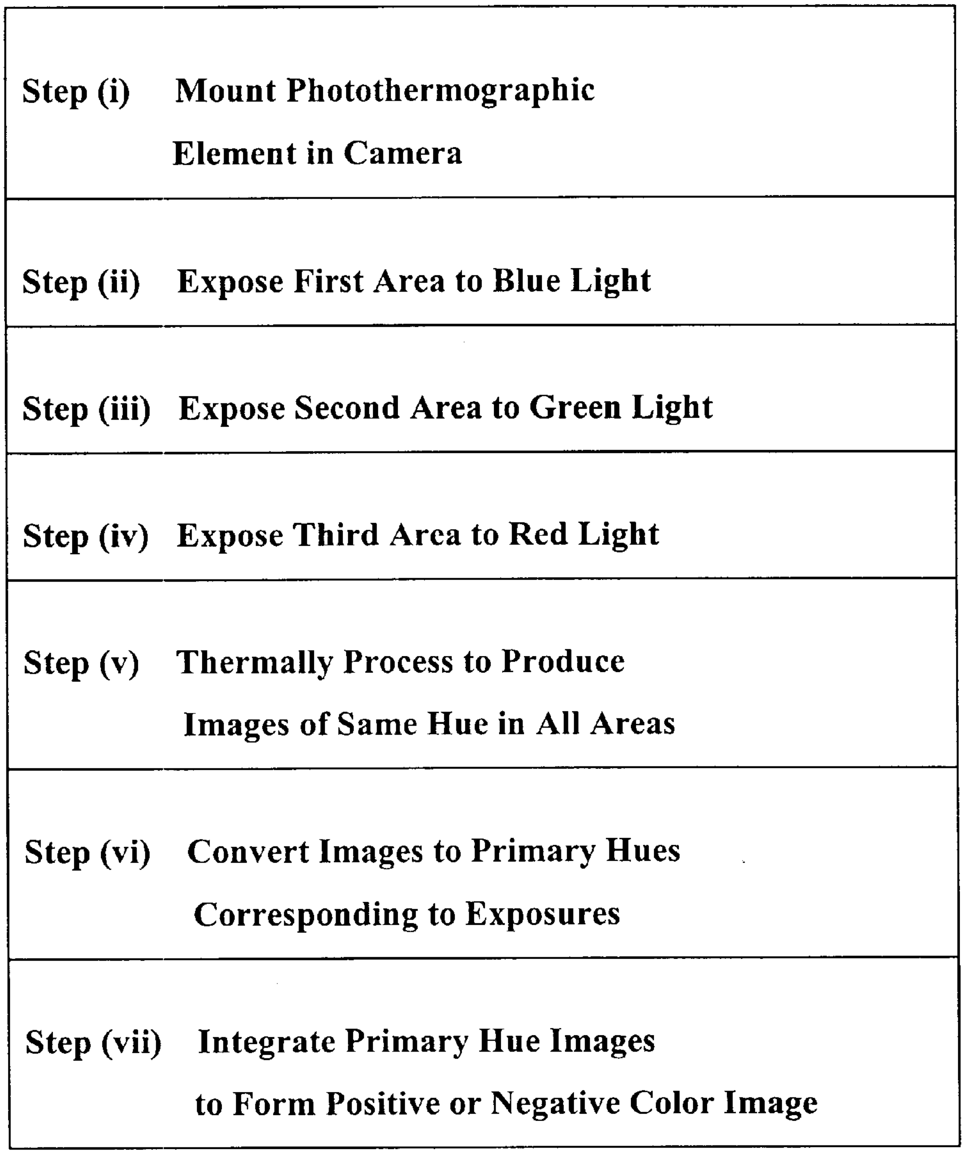
FIG. 2 is a schematic diagram of the method of the invention.

The overall sequence of steps employed in the method of the invention can be appreciated by the schematic diagram of steps shown in FIG. 2. In Step (i) a photothermographic element, such as Element I, is mounted in a camera. In Steps (ii), (iii) and (iv) first, second and third areas of the photothermographic element are exposed to blue, green and red light, respectively. In Step (v) the exposed photothermographic element is thermally processed to produce images of the same hue in all areas. In Step (vi) the images of the same hue produced by photothermographic processing are each converted to an image of an additive or subtractive primary hue, the primary hue being selected to correlate with the exposure to blue, green or red light. In Step (vii) primary hue images are integrated to form a positive or negative color image.

In the practice of the invention a novel photothermographic film construction is employed. In its simplest form the photothermographic film can consist of a single layer coated on a support, as shown by Element I.

The support can take the form of any convenient conventional photographic element support capable of withstanding thermal processing temperatures, typically within the range of from about 90 to 180° C. The support can be either reflective or transparent. When the support is reflective, exposing light passes through the photothermographic layer twice during exposure, thereby boosting the speed of the element. Typically a white reflective support is chosen. When the support is transparent, the exposure records obtained by imagewise exposure and thermal processing can be retrieved by transmission scanning, which is generally regarded as more convenient and susceptible to providing higher quality images.

Suitable supports can be selected from the conventional photographic supports disclosed in *Research Disclosure*, Vol. 389, September 1996, Item 38957, XV. Supports; *Research Disclosure*, Item 17029, XVII Supports. Film supports are specifically preferred to facilitate transport within a camera.

The photothermographic layer can consist of a single photographically responsive, thermally developable panchromatically sensitized emulsion layer containing (a) radiation-sensitive silver halide grains, at least 50 percent of the projected area of the grains being accounted for by tabular grains, (b) a plurality of spectral sensitizing dyes adsorbed to the surface of the radiation-sensitive silver halide grains chosen to provide light sensitivity in the blue, green and red portions of the spectrum, (c) a light-insensitive, reducible source of silver, (d) a developing agent, (e) a compound capable of providing a dye image upon reacting with oxidized developing agent, and (f) a hydrophilic colloid vehicle.

The radiation-sensitive silver halide grains (a) perform the function of capturing light to form a latent image upon imagewise exposure. Since photothermographic imaging systems are typically quite slow in comparison to mainstream photographic systems, it is contemplated to employ a tabular grain emulsion, so that tabular grains account for at least 50 percent of the total grain projected area of the radiation-sensitive grains. Preferably the tabular grains account for at least 70 percent and optimally at least 90 percent of total projected area of the radiation-sensitive grains. In highly monodisperse tabular grain emulsions substantially all (>98%) of total grain projected area is accounted for by tabular grains. Generally the highest attainable percentage of total grain projected area accounted for by tabular grains is sought.

A tabular grain is a grain having two parallel major crystal faces that are clearly larger than any other crystal face and that the aspect ratio of the tabular grain is at least 2. The term "aspect ratio" is defined as the ratio of its equivalent circular diameter (ECD) to its thickness (t). The ECD of a grain is the diameter of a circle having an area equal to the projected area of the tabular grain. Since tabular grains align their major faces with the major face of a supporting surface when coated, the projected area of a tabular grain is not significantly different from the area of a major face.

It is preferred that the tabular grains have an average aspect ratio of at least 5 and, most preferably, at least 8. Average aspect ratios can range to 100 or higher, but are more typically less than 70 and still more typically less than 50.

From the definition of aspect ratio above, it is apparent that mean ECD of the tabular grains is one determinant of average aspect ratio. For imaging applications mean ECD's of the radiation-sensitive grain population can are contemplated to range up to 10 $\mu$m. However, mean ECD's are usually less than 5 $\mu$m for all but the very highest speed applications. The reason for this is that image granularity is recognized to increase as a function of the mean ECD of the grain population.

The second determinant of average aspect ratio is the thickness of the tabular grains. It is usually preferred to achieve the tabular grain percentages of total grain projected area with tabular grains having a thickness of less than 0.3 $\mu$m, most preferably less than 0.2 $\mu$m. Reducing tabular grain thickness, unlike reducing tabular grain ECD, does not reduce imaging speeds, and it offers the advantage of allowing a larger number of latent image centers to be formed for a given silver coating density. This translates into lower image granularity. Thus, the lowest conveniently obtained mean tabular grain thicknesses are preferred. For example, mean tabular grain thicknesses of less than 0.07 $\mu$m (a.k.a. ultrathin tabular grains) are specifically contemplated.

The radiation-sensitive emulsions can be selected from among conventional high bromide and high chloride tabular grain emulsions. The grains of these emulsions contain greater than 50 mole percent bromide or chloride, based on silver. Silver chloride and silver bromide both form a face centered cubic crystal lattice structure and are miscible in all proportions. Silver iodide under the conditions of emulsion preparation does not form a face centered cubic crystal lattice structure and can be tolerated in the crystal lattice structure of high bromide and high chloride grains only to a saturation level. The incorporation of low levels of iodide (preferably at least about 0.5 mole percent, based on silver) into the grains increases imaging speed, but it is preferred to limit iodide incorporation to less than 15 (most preferably less than 5) mole percent, based silver.

The following types of tabular grain emulsions are specifically preferred. In describing mixed halide silver halides, the halides are named in order of ascending concentrations.

In one preferred form the emulsions are high bromide tabular grain emulsions in which the tabular grains have {111} major faces. The high bromide {111} tabular grain emulsions are preferably silver iodobromide emulsions, but minor amounts of chloride, up to about 10 mole percent, based on silver, can be advantageous.

In another preferred form the emulsions are high chloride {100} tabular grain emulsions. The high chloride {100} tabular grains typically contain a small quantity of bromide or iodide to facilitate grain nucleation.

Alternative, specifically contemplated choices are high chloride {111} tabular grain emulsions and high bromide {100} tabular grain emulsions.

The tabular grain emulsions can be chemically sensitized by any convenient conventional technique. Most commonly either middle chalcogen (e.g., sulfur and/or selenium) sensitization, noble metal (e.g., gold) sensitization, or a combination of both are undertaken. Conventional chemical sensitizations are disclosed by *Research Disclosure*, Item 38957, IV. Chemical sensitization.

The following, here incorporated by reference, are representative of chemically sensitized high bromide tabular grains contemplated for use in the practice of the invention:

| | |
|---|---|
| Mignot | U.S. Pat. No. 4,386,156; |
| Kofron et al | U.S. Pat. No. 4,439,520; |
| Wilgus et al | U.S. Pat. No. 4,434,226; |
| Solberg et al | U.S. Pat. No. 4,433,048; |
| Maskasky | U.S. Pat. No. 4,435,501; |
| Maskasky | U.S. Pat. No. 4,713,320; |
| Tsaur et al | U.S. Pat. No. 5,147,771; |
| Tsaur et al | U.S. Pat. No. 5,147,772; |
| Tsaur et al | U.S. Pat. No. 5,147,773; |
| Tsaur et al | U.S. Pat. No. 5,171,659; |
| Mignot | U.S. Pat. No. 5,386,156; |
| Maskasky | U.S. Pat. No. 5,411,853; |
| Maskasky | U.S. Pat. No. 5,418,125; |
| Daubendiek et al | U.S. Pat. No. 5,494,789; |
| Olm et al | U.S. Pat. No. 5,503,970; |
| Wen et al | U.S. Pat. No. 5,536,632; |
| King et al | U.S. Pat. No. 5,518,872; |
| Fenton et al | U.S. Pat. No. 5,567,580; |

-continued

| | |
|---|---|
| Daubendiek et al | U.S. Pat. No. 5,573,902; |
| Dickerson | U.S. Pat. No. 5,576,156; |
| Daubendiek et al | U.S. Pat. No. 5,576,168; |
| Olm et al | U.S. Pat. No. 5,576,171; |
| Deaton et al | U.S. Pat. No. 5,582,965. |

The following, here incorporated by reference, are representative of chemically sensitized high chloride tabular grain emulsions contemplated for use in the practice of the invention:

| | |
|---|---|
| Wey | U.S. Pat. No. 4,399,215; |
| Maskasky | U.S. Pat. No. 4,713,323; |
| Maskasky | U.S. Pat. No. 5,178,997; |
| Maskasky | U.S. Pat. No. 5,178,998; |
| Maskasky | U.S. Pat. No. 5,185,239; |
| Maskasky | U.S. Pat. No. 5,389,509; |
| Maskasky | U.S. Pat. No. 5,399,478; |
| Maskasky | U.S. Pat. No. 5,411,852; |
| Maskasky | U.S. Pat. No. 5,264,337; |
| Maskasky | U.S. Pat. No. 5,292,632; |
| House et al | U.S. Pat. No. 5,320,938; |
| Maskasky | U.S. Pat. No. 5,275,930; |
| Brust et al | U.S. Pat. No. 5,314,798; |
| Yamashita et al | U.S. Pat. No. 5,641,620; |
| Oyamada et al | U.S. Pat. No. 5,665,530. |

The silver halide grains are precipitated in the presence of a hydrophilic colloid peptizer. Subsequently additional hydrophilic colloid is introduced as a binder, the peptizer and binder together form the hydrophilic colloid of the photothermographic imaging layer. Although hydrophobic vehicles, typically a poly(vinyl acetal), such as poly(vinyl butyral), are most commonly employed in constructing photothermographic imaging layers, it has been observed that aqueous coatings containing hydrophilic colloid vehicle contribute to achieving the higher imaging speeds of image capture films. Any of the hydrophilic colloid peptizers, binders, and commonly associated components, such as vehicle extenders and hardeners disclosed in *Research Disclosure*, Item 38957, II. Vehicles, vehicle extenders, vehicle-like addenda and vehicle related addenda, can be incorporated in the photothermographic imaging layer. Gelatin and gelatin derivatives, such as acid-treated gelatin, alkali-treated gelatin, acetylated gelatin, phthalated gelatin, and the like, are preferred vehicles.

The photothermographic layer is panchromatically spectrally sensitized. That is, the radiation-sensitive grains are spectrally sensitized with dyes chosen to render the photothermographic layer responsive to light in the blue, green and red regions of the visible spectrum. Where high bromide emulsions and particularly iodide containing high bromide emulsions are employed, the native blue sensitivity of the grains can be relied upon for light capture in the blue region of the spectrum. This allows a combination of green (absorption peak) spectral sensitizing dye and red (absorption peak) spectral sensitizing dye to be adsorbed to the grain surfaces. However, it is preferred to boost blue speed by employing additionally blue (absorption peak) spectral sensitizing dye. Blue, green and red or green and red spectral sensitizing dyes can be added together to a single grain population to achieve panchromatic sensitization. When this is done, it is preferred to add the dye that least tightly adsorbs first and the dye that most tightly adsorbs last. However, by limiting the amount of any one dye to just that required to provide its proportionate percent of monolayer coverage on the grain surface when adsorbed, dye displacement can be minimized.

Instead of adding all of the dyes to all of the grains, it is alternatively contemplated to separate the emulsion into separate portions, to spectrally sensitize each portion to one region of the spectrum, and then recombine and mix the portions to create a panchromatically sensitized emulsion.

The spectral sensitizing dyes as well as supersensitizers often employed in combination can be chosen from among those conventionally employed in black-and-white and color silver halide photographic elements. Specific spectral sensitizing dyes and supersensitizers are described in *Research Disclosure*, Item 38957, V. Spectral sensitization and desensitization, A. Sensitizing dyes. An advantage of panchromatic sensitization is that spectral sensitizing dyes can be employed having half peak absorption bandwidths extending into the blue and green, the green and red, or each of the blue, green and red regions of the spectrum, whereas sequential layer arrangements require principal dye absorption to be confined to a single region of the visible spectrum.

The spectrally sensitized silver halide grains are responsible for imaging speed, but make only a small contribution to final image density. Light exposed silver halide grains upon development catalyze an oxidation-reduction reaction between color developing agent and a light-insensitive, reducible silver compound resulting in the physical development of silver. It is the latter oxidation-reduction reaction that primarily accounts for image density.

Any light-insensitive, reducible source of silver can be employed that can be uniformly dispersed in the hydrophilic colloid vehicle. Among specifically contemplated reducible sources of silver are silver salts of mercapto or thione substituted compounds having a heterocyclic nucleus containing 5 or 6 ring atoms, at least one of which is nitrogen, with other ring atoms including carbon and up to two hetero-atoms selected from among oxygen, sulfur and nitrogen. Typical preferred heterocyclic nuclei include triazole, oxazole, thiazole, thiazoline, thiazole, imidazoline, imidazole, diazole, pyridine and triazine. Preferred examples of these heterocyclic compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(2-ethyl-glycolamido) benzothiazole, a silver salt of 5-carboxylic-1-methyl-2-phenyl-4-thiopyridine, a silver salt of mercaptotriazine, a silver salt of 2-mercaptobenzoxazole, a silver salt as described in U.S. Pat. No. 4,123,274, for example, a silver salt of 1,2,4-mercaptothiazole derivative such as a silver salt of 3-amino-5-benzylthio-1,2,4-thiazole, a silver salt of a thione compound such as a silver salt of 3-(2-carboxyethyl)-4-methyl-4-thiazoline-2-thione as disclosed in U.S. Pat. No. 3,201,678. Examples of other useful mercapto or thione substituted compounds that do not contain a heterocyclic nucleus are illustrated by the following: a silver salt of thioglycolic acid such as a silver salt of a S-alkylthioglycolic acid (wherein the alkyl group has from 12 to 22 carbon atoms) as described in Japanese patent application 28221/73, a silver salt of a dithiocarboxylic acid such as a silver salt of dithioacetic acid, and a silver salt of thioamide.

As another alternative, a silver salt of a compound containing an imino group can be used. Preferred examples of these compounds include a silver salt of benzothiazole and a derivative thereof as described in Japanese patent publications 30270/69 and 18146/70, for example a silver salt of benzotriazole such as silver salt of methylbenzotriazole, etc., a silver salt of a halogen substituted benzotriazole, such as a silver salt of 5-chlorobenzotriazole, etc., a silver salt of 1,2,4-triazole, of 1H-tetrazole as described in U.S Pat. No. 4,220,709, a silver salt of imidazole and an imidazole derivative, and the like.

A development component is incorporated in the photothermographic layer to reduce latent image bearing silver halide grains and to enter into an oxidation-reduction reaction with the light-insensitive, reducible silver source during thermal processing. To increase image density without any further increase in silver coating coverages the development component chosen to also be capable of providing a dye image during thermal processing.

In one preferred form the development component is a combination of color developing agent and dye-forming coupler. Color developing agents are p-phenylenediamines with at least one of the amino groups being a primary amine. Upon reducing silver a p-phenylenediamine is converted to a quinonediimine that reacts with a dye-forming coupler to produce an image dye. Particularly useful as color developing agents are p-phenylenediamine and especially the N-N-dialkyl-p-phenylenediamines in which the alkyl groups or the aromatic nucleus can be substituted or unsubstituted. Common p-phenylenediamine color developing agents are N-N-diethyl-p-phenylenediamine monohydrochloride, 4-N, N-diethyl-2-methylphenylenediamine monohydrochloride, 4-(N-ethyl-N-2-methanesulfonyl-aminoethyl)-2-methylphenylenediamine sesquisulfate monohydrate, and 4-(N-ethyl-N-2-hydroxyethyl)-2-methylphenylenediamine sulfate. Other p-phenylenediamines include those described in Nakamura et al U.S. Pat. No. 5,427,897, Mihayashi et al U.S. Pat. No. 5,380,625, Haijima et al U.S. Pat. No. 5,328, 812, Taniguchi et al U.S. Pat. No. 5,264,331, Kuse et al U.S. Pat. No. 5,202,229, Mikoshiba et al U.S. Pat. No. 5,223,380, Nakamuara et al U.S. Pat. No. 5,176,987, Yoshizawa et al U.S. Pat. No. 5,006,437, Nakamuara U.S. Pat. No. 5,102, 778 and Nakagawa et al U.S. Pat. No. 5,043,254.

The dye-forming couplers can take any convenient conventional form. Image dye-forming couplers are disclosed in *Research Disclosure*, Item 38957, X. Dye image formers and modifiers, B. Image-dye-forming couplers and by James *The Theory of the Photographic Process,* 4th Ed., Macmillan, N.Y., 1977, Chapter 12 Principles of Chemistry of Color Photography, III Color Forming Agents.

Since the dye images produced are intended to be scanned rather than viewed, the dye-forming couplers can be chosen to produce any image dye hue. It has been observed that the highest quality final images for viewing are produced when magenta dye images are produced in the photothermographic layer. This is attributable to the fact that the scanners produce less noise when scanning magenta dye images than images of other hues. It is possible to employ combinations of dye-forming couplers that produce image dyes having absorption half-peak bandwidths in different portions of the visible spectrum. With a combination of dye-forming couplers that produces relatively neutral (e.g., black or near-black) images, the film can be efficiently scanned in any convenient region of the visible spectrum. This avoids pre-selecting a specific match of image dye hues with the wavelengths of scanners employed for information retrieval.

The development component can alternatively take the form of a leuco dye capable of acting as a reducing agent that forms an dye image upon oxidation. The leuco dye can be any colorless or slightly colored compound that can be oxidized to a colored form, when heated, preferably to a temperature of from about 80 to 250° C. for a duration of from 0.5 to 300 seconds. Any leuco dye capable of being oxidized by silver ion to form a visible image can be used.

Representative classes of leuco dyes that are suitable for use in the present invention include, but are not limited to, bisphenol and bisnaphthol leuco dyes, phenolic leuco dyes, indoaniline leuco dyes, imidazole leuco dyes, azine leuco dyes, oxazine leuco dyes, diazine leuco dyes, and thiazine leuco dyes. Preferred classes of dyes are described in U.S. Pat. Nos. 4,460,681 and 4,594,307.

One class of leuco dyes useful in this invention are those derived from imidazole dyes. Imidazole leuco dyes are described in U.S. Pat. No. 3,985,565.

Another class of leuco dyes useful in this invention are those derived from so-called “chromogenic dyes”. These dyes are prepared by oxidative coupling of a p-phenylenediamine with a phenolic or anilinic compound. Leuco dyes of this class are described in U.S. Pat. No. 4,594,307.

A third class of dyes useful in this invention are “aldazine” and “ketazine” dyes. Dyes of this type or described in U.S. Pat. Nos. 4,587,211 and 4,795,697.

Another preferred class of leuco dyes are reduced forms of dyes having a diazine, oxazine, or thiazine nucleus. Leuco dyes of this type can be prepared by reduction and acylation of the color-bearing dye form. Methods of preparing leuco dyes of this type ore described in Japanese Patent 52-89131 and U.S. Pat. Nos. 2,784,186; 4,439,280; 4,563,415; 4,570, 171; 4,622,395 and 4,647,525, all of which are incorporated hereby by reference.

Still other development components, including combinations of developing agents and image dye providing materials, are disclosed in *Research Disclosure*, Item 17029, XV. Color materials.

Various conventional components that are employed in combination with dye image formers can additionally be present in the photothermographic layer. Such components include those set out in *Research Disclosure*, Item 38957, cited above, X. Dye image modifiers and addenda, C. Image dye modifiers, D. Hue modifiers/stabilization, and E. Dispersing dyes and dye precursors. Dye image stabilizers, such as those set out in paragraph (3) of section D, are particularly preferred components.

Concentrations of the essential components of the photothermographic layer described above are useful over conventional ranges. As disclosed by Hanzalik et al U.S. Pat. No. 5,415,993, the chemically and spectrally sensitized silver halide grains can be present in a concentration as low as 0.01 percent by weight, based on the total weight of the photothermographic layer. It is preferred that the silver halide grains be present in a concentration of at least 5 and, optimally, at least 10 percent by weight, based on the total weight of the photothermographic layer. Silver halide grain concentrations of up to 35 percent by weight or higher, based on the total weight of the photothermographic layer are contemplated, but, for most imaging applications, it is preferred that the silver halide grains be present in concentrations of less than 25 (optimally less than 10) percent by weight, based on the total weight of the photothermographic layer.

The light-insensitive, reducible source of silver typically constitutes from 20 to 70 percent by weight of the photothermographic layer. It is preferably present at a level of 30 to 35 percent by weight of the photothermographic layer.

The development component is incorporated in an amount sufficient, on a stoichiometric basis, to convert all silver ions to silver while providing a dye image. For example, the color developing agent is preferably present in at least a concentration sufficient, calculated on a stoichiometric basis, to reduce fully both silver halide and the light-insensitive silver source to silver. Similarly, the dye-forming coupler is preferably present in at least a concentration sufficient, on a stoichiometric basis, to react with all oxidized color coupler.

The hydrophilic colloid vehicle can be present in any convenient conventional concentration capable of dispersing the essential components described above. Typically a preferred ratio of the vehicle to the light-insensitive, reducible silver source ranges from 15:1 to 1:2, most typically from 8:1 to 1:1.

In addition to the essential components described above the photothermographic layer can contain other common conventional addenda to facilitate fabrication, improve performance, or increase stability. It is specifically contemplated to incorporate antifoggants and stabilizers, such as those summarized in *Research Disclosure*, Item 38957, VII. Antifoggants and stabilizers, and *Research Disclosure*, Item 17029, VIII Antifoggants/Post-Processing Print-Out Stabilizers.

Addenda contemplated to improve the physical properties of the photothermographic layer are contemplated. Such addenda are illustrated by *Research Disclosure*, Item 38957, cited above, IX. Coating physical property modifying addenda, A. Coating aids, B. Plasticizers and lubricants, C. Antistats and D. Matting Agents and by *Research Disclosure*, Item 17029, cited above, X. Coating Aids.

The foregoing discussion has been referenced to the simplest possible construction, Element I, consisting of only a support and a single photothermographic layer. It is appreciated that in practice other layers are commonly employed in combination. The photothermographic layer can, for example, be divided into two contiguous layers. The silver halide grains, the light-insensitive silver source, the color developing agent and the dye-forming coupler, while preferably all incorporated in a single photothermographic layer, can be distributed between contiguous layers.

A protective overcoat layer is preferably coated over the photothermographic layer. Such layers are illustrated by *Research Disclosure*, Item 17029, cited above, XI. Overcoat layers. It is appreciated that the physical property modifying components, such as coating aids, plasticizers and lubricants, antistats and matting agents, described above for incorporation in the photothermographic layer can be and usually are shifted in whole or in part from the photothermographic layer to an outer layer, such as an overcoat, or, in some instances, a backing layer on the opposite side of the support. The vehicle forming the overcoat layer preferably is chosen for compatibility with the vehicle of the photothermographic layer while the binder of any backing layer can be independently chosen.

The photothermographic layer can contain a filter or antihalation dye. Suitable dyes are disclosed in *Research Disclosure*, Item 17029, cited above, XIV. Filter Dyes/Antihalation Layers, and Item 38957, cited above, VIII. Absorbing and scattering materials, particularly B. Absorbing materials. When an antihalation dye is employed, it can be incorporated in the photothermographic layer, but to increase speed it is normally incorporated in an underlayer coated between the photothermographic layer and the support or in a backing layer. When an underlayer is provided, it contains a binder compatible with the photothermographic layer and usually employs the same binder. It is recognized that various of the optional addenda described above for incorporation in the photothermographic layer can be shifted in whole or in part to the underlayer.

In using the photothermographic film to produce a viewable color image replicating the appearance of a photographic subject, a simple approach for image capture is to mount the photothermographic film in a fixed position camera (e.g., a camera mounted on a tripod). The film is exposed in a first area to light from the subject that has passed through one filter of a set of blue, green or red filters. Thereafter, the film is advanced in the camera, and the procedure is repeated using another filter from the set, resulting in a second exposure of the film in a second area laterally offset from the first area. Thereafter, the film is advanced a second time in the camera, and the procedure is repeated using the final remaining filter from the set, resulting in a third exposure of the film in a third area laterally offset from the first and second areas.

Additionally, it is preferred, but not required, to expose the photothermographic film a fourth time in a fourth laterally offset area without employing any of the blue, green and red filters from the set. This exposure provides a reference black-and-white image that facilitates obtaining accurate density levels in subsequently recombining the blue, green and red exposure information to produce a viewable image.

Successive film exposures require, of course, that the photographic subject remain in place throughout the three exposure sequence. If either the camera or the photographic subject shift in position during the sequence of exposures, the blue, green and red images captured cannot later be perfectly aligned, and the result is, at best, an unsharp color image for viewing.

To overcome the risks of non-alignment inherent in the sequential capture of blue, green and red light image information, a camera can be constructed that contains three or four laterally offset lenses aligned to expose concurrently the same laterally offset areas of the photothermographic film. Three lenses are each covered with one of the blue, green and red filters from the three filter set noted above. This allows either or both of the camera and the photographic subject to be in motion at the time of imagewise exposure of the photothermographic film.

Instead of constructing a camera with three or four laterally offset lenses, the same result can be realized with a more compact camera using a single lens and splitting the light passing through the lens into separate beams and then directing three of the beams through blue, green and red filters to three laterally offset areas of the photothermographic film. A fourth beam can again reach the film without passing through any of the blue, green and red filters.

An important point to notice is that the light striking the photothermographic layer unit in each laterally offset area does not have to penetrate any overlying layer unit to reach the layer unit in which the light exposure is recorded. This allows a high degree of image sharpness to be realized. Further, no significant light attenuation occurs prior the layer unit in which the light exposure is recorded.

Following exposure, photothermographic film is removed from the camera and heated to a temperature in the range of from 80 to 250° C., preferably from 120 to 200° C. Processing times of from 1 second to 2 minutes are contemplated, but preferably thermal processing is conducted in less than 30 seconds. Any form of heating that exposes all areas of the film simultaneously or sequentially to the same level of heating for a limited time can be employed. A preferred processing technique is to pass the imagewise exposed film between uniformly heated rollers.

The film is not light exposed prior to thermal processing, but can thereafter be handled in roomlight. However, for best results it is preferred to protect the film from light exposure until the image information is retrieved from the film by scanning. Further, although scanning can be deferred, particularly where the film is protected from light during storage, it is preferred to scan the film promptly following the completion of thermal processing step. Ideally the photothermographic film is scanned immediately after it has passed through the heated rollers used for thermal processing.

Any conventional scanning technique employed to retrieve the blue, green, red and optional neutral exposure records from the processed photothermographic film. The side-by-side offset location of the exposed areas allows each to be scanned independently of the other exposed areas. Color photographic elements in main-stream photography can be scanned even though three superimposed dye image layer units are present, since developed silver is removed by bleaching. However, to the extent dye absorptions in the superimposed layer units overlap, image information obtained for scanning is degraded. In photothermographic elements silver removal by bleaching does not occur; hence, scanning color photothermographic elements with superimposed dye image layer units yields still further degraded image records. The blue, green and red image records obtained from the photothermographic elements of the invention are superior to those obtainable from superimposed layer units in main-stream or photothermographic films.

A further advantage of the invention is that the separate blue, green and red image records can be obtained with a single scanning beam, since each of the records scanned is of the same hue. In conventional scanning of color photographic elements a white light scanner is employed with separate blue, green and red filters, requiring that scanning be performed three times with a separate filter each time. Alternatively, separate blue, green and red scanning beams must be provided. With either conventional approach scanning is more complicated and dependent upon relative calibration for satisfactory results.

Once the blue, green, red and optional neutral exposure records have been retrieved by scanning, they can be stored in digital form in a computer. By computer manipulation the blue, green and red records can be superimposed to form a single integrated color image replicating the original photographic subject. It is also possible during computer manipulation to reverse the image from positive to negative or vice versa. Spatial reversal (left to right reversal) can also be undertaken, if desired. Additionally, editing of the image while stored in digital form can be easily undertaken.

If a hardcopy of the digitally stored image is desired, this can be attained merely by using the digital image to control photodiode or laser exposure of a silver halide photographic element. For example, it is common practice to expose color photographic paper using a digital image stored in a computer. It is also possible to create a color negative image on a transparent film support to be used for conventional printing onto a color paper. Alternatively, the digitally stored image can be used to control an ink jet or thermal printer.

An important advantage of the present invention is that higher image discrimination and lower minimum density in each of the blue, green and red exposure records is realized. When a conventional superimposed layer unit color film is scanned, the scanning beam wavelength is chosen to lie within the half-peak absorption bandwidth of the dye forming the image to be scanned. Any silver within any of the superimposed layer units cannot be distinguished from the image dye during scanning, since silver has a broad absorption band extending throughout the visible spectrum and well into the infrared spectrum.

For example, in a photothermographic element having superimposed layer units, the observed maximum density in a region exposed to only blue, green or red light is the sum of the maximum image dye and silver densities in the blue, green or red layer unit plus the minimum silver densities in each of the two remaining superimposed layer units. The minimum density, in areas that are not light exposed, is the sum of the silver minimum densities in the three layer units. Image discrimination is the difference between the maximum and minimum densities observed on scanning. When scanning signals are manipulated in digital form, the absolute value of the minimum density is unimportant, since this is adjusted (normalized) to some selected value. Color saturation in areas of maximum density is then determined by the density increase above the normalized minimum density. Thus, color saturation is a function of image discrimination, not absolute density levels. Since minimum density contributions are occurring from three superimposed layer units, image discrimination of the digital image is necessarily a limited percentage of normalized minimum density.

In the present invention, maximum density in a region of blue, green or red light exposure is the sum of maximum image dye and silver densities in the blue, green or red layer unit. This is reduced by only a small percentage from the superimposed layer arrangement described above in that there are no superimposed layer units to contribute their minimum densities to the total maximum density observed. On the other hand, minimum density is only one third of its value in a superimposed layer unit photothermographic element, since, again, there are no superimposed layer units to contribute minimum density. Thus, the photothermographic elements of the invention produce lower minimum densities and higher image discrimination (maximum density minus minimum density). When digital color records with normalized minimum densities derived from the photothermographic elements of the invention and photothermographic elements with superimposed layer units are compared, the photothermographic elements of the invention produce higher levels of color saturation.

Since images based on information extracted by scanning contain fewer pixels than images produced by main-stream photographic printing methods, it is advantageous to maximize the quality of the image information available from each digitally stored pixel. Enhancing image sharpness and minimizing the impact of aberrant pixel signals (i.e., noise) are common approaches to enhancing the quality of the digital image. A conventional technique for minimizing the impact of aberrant pixel signals is to adjust each pixel density reading to a weighted average value by factoring in readings from adjacent pixels, closer adjacent pixels being weighted more heavily.

Illustrative systems of scan signal manipulation, including image records, are disclosed by Bayer U.S. Pat. No. 4,553,165, Urabe et al U.S. Pat. No. 4,591,923, Sasaki et al U.S. Pat. No. 4,654,722, Yamada et al U.S. Pat. No. 4,670,793, Klees U.S. Pat. Nos. 4,694,342 and 4,962,542, Powell U.S. Pat. No. 4,805,031, Mayne et al U.S. Pat. No. 4,829,370, Abdulwahab U.S. Pat. No. 4,839,721, Matsuanawa et al U.S. Pat. Nos. 4,841,361 and 4,937,662, Mizukoshi et 3 0 al U.S. Pat. No. 4,891,713, Petilli U.S. Pat. No. 4,912,569, Sullivan et al U.S. Pat. No. 4,920,501, Kimoto et al U.S. Pat. No. 4,939,979, Hirosawa e al U.S. Pat. No. 4,972,256, Kaplan U.S. Pat. No. 4,977,521, Skai U.S. Pat. No. 4,979,017, Ng U.S. Pat. No. 5,003,494, Katayama et al U.S. Pat. No. 5,008,950, Kimura et al U.S. Pat. No. 5,065,255, Osamu et al U.S. Pat. No. 5,051,841, Lee et al U.S. Pat. No. 5,012,33, Sullivan et al U.S. Pat. No. 5,070,413, Bowers et al U.S. Pat. No. 5,107,345, Telle U.S. Pat. No. 5,105,266, MacDonald et al U.S. Pat. No. 5,105,469, and Kwon et al U.S. Pat. No. 5,081,692, the disclosures of which are here incorporated by reference.

EXAMPLES

Glossary of Acronyms:

| | |
|---|---|
| SS-1 | Anhydro-9-ethyl-5,5'-difluoro-3,3'-bis(3-sulfopropyl)oxacarbocyanine hydroxide, sodium salt |
| SS-2 | Anhydro-6,6'-dichloro-1,1'-diethyl-3,3'-bis(3-sulfopropyl)-5,5'-bis(trifluromethyl) benzimidazole carbocyanine hydroxide, sodium salt |
| SS-3 | Anhydro-9-methyl-3,3'-di(4-sulfobutyl)thiacarbocyanine hydroxide |
| SS-4 | Anhydro-5-chloro-9-ethyl-5'-phenyl-3'-(3-sulfobutyl)-3-(3-sulfopropyl)oxacarbocyanine hydroxide, sodium salt |
| SS-5 | Anhydro-3,9-diethyl-3'-methylsulfonylcarbamoylmethyl-5-phenyloxathiocarbocyanine hydroxide |
| SS-6 | Anhydro-3'-methyl-4'-phenyl-3-(3-sulfopropyl)naphtho-[1,2-d]-thiazolothiazolocyanine hydroxide |
| SS-7 | Anhydro-1,3'-bis(3-sulfopropyl)-naphtho[1,2-d]thiazolothiacyanined hydroxide, sodium salt |
| SS-8 | Anhydro-3,3'-bis(3-sulfopropyl)-5,6-dimethoxy-11-ethyl-naphtho[1,2-d] oxazolothiacarbocyanine hydroxide |
| SS-9 | Anhydro-5,5'-dichloro-9-ethyl-3,3'-bis(3-sulfopropyl)thiacarbocyanine hydroxide |

C-1

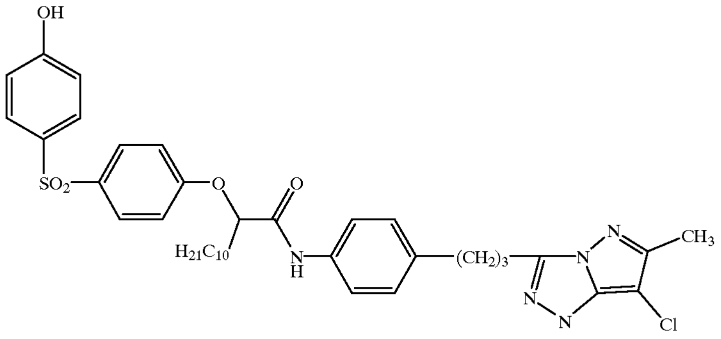

C-2

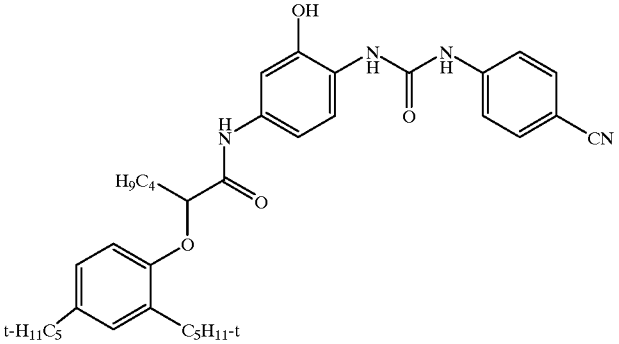

C-3

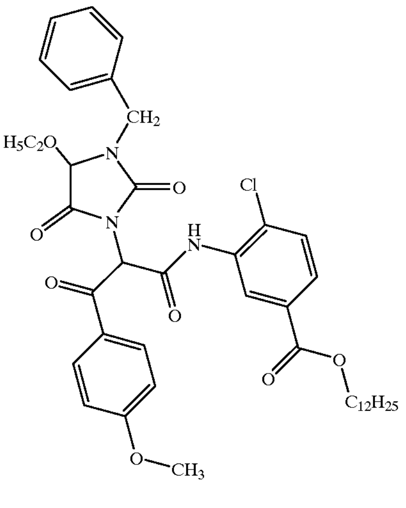

-continued

| | |
|---|---|
| S-1 | tert-Butylphenoxyethoxyethyl sulfonic acid |
| DEV-1 | 2-[2-(4-amino-3-methylphenyl)ethylamino]ethanol sulfate |

Example 1

A panchromatically sensitive silver iodobromide tabular grain emulsion (Emulsion 1) was prepared in the following manner: To a well stirred reaction vessel at 68° C. were added 19.6 g of lime processed bone gelatin, 56 g of NaBr, and 2.3 g of a polyethylene oxide antifoamant, and enough water to bring the final volume to 8.1 liters. Grain nucleation was accomplished by the addition of 350 cc of 2.5 molar silver nitrate over 3 minutes. A solution of 175 g of lime processed bone gelatin and 0.25 cc of a polyethylene oxide antifoamant in 1.64 liters was then added to the reaction vessel. After four minutes, grain growth was accomplished by the addition of a 2.5 molar silver nitrate at the flow rates and times listed in Table I. A salt solution containing 2.2 moles of NaBr per liter and 0.3 moles of KI per liter was used to maintain a constant pBr in the reaction vessel. At the conclusion of growth segment V, 581 mL of a 3.0 M NaBr solution and 817 mL of a 0.3 M suspension of AgI Lippmann emulsion were added to the reaction vessel. Finally, the 2.5 M $AgNO_3$ solution was added at a constant flow rate of 80 mL/minute until the pBr reached 4.2. At the conclusion of grain growth the emulsion was washed and concentrated by ultrafiltration.

The resulting silver iodobromide tabular grain exhibited a mean ECD of 0.65 μm and a mean grain thickness of 0.09 μm. Tabular grain accounted for greater than 70 percent of total grain projected area. The overall iodide concentration of the emulsion was 11.48 mole percent, based on silver.

The emulsion was panchromatically sensitized using a 3:3:5 molar ratio of spectral sensitizing dyes SS-1, SS-2 and SS-3. The emulsion was optimally sulfur and gold sensitized using potassium tetrachloroaurate(III) and sodium thiosulfate.

TABLE I

| Growth Segment | Initial Flow mL/min | Final Flow mL/min | Segment Time minutes |
|---|---|---|---|
| I | 36 | 36 | 8 |
| II | 36 | 44 | 8 |
| III | 44 | 80 | 8 |
| IV | 80 | 128 | 8 |
| V | 128 | 128 | 3.5 |

Onto a cellulose acetate photographic film support were coated the following layers. Coating coverages are in g/$m^2$ and silver-containing components are based on the weight of silver.

| Photothermographic coating 1: | |
|---|---|
| Layer 1 | |
| Silver halide emulsion 1 | 0.65 |
| Dye-forming coupler C-1 | 0.75 |
| Silver 3-amino-5-benzylmercapto-1,2,4-triazole | 0.65 |
| Gelatin | 2.2 |
| Surfactant (S-1) | 0.04 |
| Layer 2 | |
| Developing agent DEV-1 | 0.65 |
| sodium sulfite | 0.16 |
| Gelatin | 3.3 |
| Surfactant S-1 | 0.04 |

Photothermographic coating 2 was identical to coating 1 except it did not contain dye-forming coupler C-1.

Photothermographic coatings 1 and 2 each received a color separation exposure through a Wratten 58 (green) filter and a neutral density step tablet containing eleven steps which varied in optical density between zero and 2. The coatings were heat-processed for 2 seconds at 130° C. The images formed were read using a Nikon LS-1000™ film scanner.

The function of the film scanner is to electronically convert film densities into a set of output (code) values. The usual spread for these code values is 0 to 255. Because the density range of a film negative varies from scene to scene, it is common for film scanners to allow the user to create a set of 10 customized input/output values. The software used for the Nikon LS-1000 allows the user to specify a smooth curve relating the input values into 256 code values. These code values in turn become input values for image manipulation software, such as Adobe Photoshop™, where they may be further refined prior to output either as a soft display or as hard digital output. There also exist other electronic image pathways, such as Fuji Frontier™ or PhotoCD™, with their own framework to account for the characteristics of the origination film and the output device. Although these pathways differ, they share the common goal of obtaining appropriate tone scale and color reproduction in the images they produce.

Photothermographic coatings 1 and 2 were each scanned using the appropriate input/output values to provide equivalent average green record code values for each of the eleven patches, as shown in Table II. These code values were transferred to a PowerMacintosh 8500, made by Apple computer. Using Adobe Photoshop™ 3.0.5 software, the code value histogram was reviewed for each of the eleven uniformly exposed regions in each scanned image. This histogram is simply a plot of the number of pixels in the selected region as a function of their code value; the mean and standard deviation for the distribution are also provided. The quality of the scanned images was determined by comparing the standard deviation of the code value histograms for each patch, as shown in Table II. A lower standard deviation means the image quality is superior. The standard deviation of pixel code values in a patch of photothermographic coating 1 containing a color coupler is 4–7 times less than the non-coupler containing coating.

TABLE II

| step | mean code value | standard deviation for photothermographic coating 1 | standard deviation for photothermographic coating 2 (comparative) |
|---|---|---|---|
| 1 | 54 | 8.30 | 33.7 |
| 2 | 77 | 7.63 | 38.5 |
| 3 | 92 | 6.89 | 35.3 |
| 4 | 110 | 6.01 | 25.0 |
| 5 | 125 | 8.43 | 27.8 |
| 6 | 141 | 7.69 | 38.4 |
| 7 | 154 | 8.45 | 42.3 |
| 8 | 170 | 9.14 | 44.0 |
| 9 | 199 | 8.49 | 41.6 |
| 10 | 210 | 6.64 | 44.0 |
| 11 | 222 | 6.52 | 46.5 |

Example 2

Images reconstructed from color separation exposures

Photothermographic coating 1 was used in a color separation camera to faithfully reproduce a test scene. The camera comprised a light-tight enclosure, a mechanical shutter, a lens to focus the scene onto an image plane, beam splitting dichroic mirrors, and conventional mirrors to direct the light onto the film element supported in the image plane. Upon passing through the shutter and lens, predominantly red light is reflected by the first dichroic mirror while the blue and green components are transmitted to the second dichroic mirror. The reflected red light is directed to the image plane by a conventional mirror. The second dichroic mirror reflects predominantly blue light transmitting the green component. The reflected blue component is directed to the image plane using a conventional mirror. The transmitted green light is also directed to the common image plane using conventional mirrors. This system yields three separate images: one comprising predominantly red wavelengths, one predominantly blue, and one predominantly green. The test scene was captured as three color separations on the panchromatically sensitized monochromatic photothermographic coating 1.

The exposed photothermographic film element was heat processed at 130° C. for 2 seconds. The color separation negative was scanned as a grayscale image using a MicroTek™ flat-bed scanner. The scanned images were cropped and the code values were then manipulated, providing optimal tone scale and color balance to faithfully reproduce the test scene. The three cropped images were overlayed as separate color channels using Adobe Photoshop™ 4.0 and brought into registry. The overlayed image could then be viewed as an RGB full color 15 image and output to a variety of full color output devices.

Example 3

A photothermographic film containing a mixture of red sensitized, green sensitized, and blue sensitized high chloride {100} tabular grain emulsions and a mixture of cyan, magenta, and yellow couplers was used for color separation image capture. The color separation negatives were scanned with a film scanner and electronically reconstructed into a full color image.

A AgICI {100} tabular grain emulsion (Emulsion 2) was prepared in the following manner:

To a well stirred reaction vessel at 35° C. were added 1.48 g of NaCl, 38.8 g of an oxidized lime processed bone gelatin, 0.28 g of KI, and enough water to bring the final volume to 4.5 liters. Grain nucleation was accomplished by simultaneous addition of SOLN-1, 4 M $AgNO_3$ containing 0.32 g/L of $HgCl_2$, and 4 M NaCl, both at a rate of 21 mL/min for 0.5 minute.

Immediately following nucleation, 9.1 L of a solution containing 0.39 g/L NaCl and 0.12 g/L of KI were added to the reaction vessel. This mixture was held for 8 minutes. Grain growth was accomplished by adding SOLN-1 at the flow rates and times listed in Table III. The pCI of the reaction vessel was maintained at 2.2 by the simultaneous addition of 4 M NaCl.

TABLE III

| Growth Segment | Initial Flow mL/min | Final Flow mL/min | Segment Time minutes |
|---|---|---|---|
| I | 14 | 14 | 5 |
| II | 14 | 42 | 52 |

At the conclusion of growth segment II, a 4 M solution of NaCl was added into the reaction vessel at 14 mL/min for 5 minutes, followed by a hold for 30 minutes. Thereafter, SOLN-1 was added to the reaction vessel at 14 mL/min for 5 minutes, followed by the addition of 70 mL of a solution containing 5.25 g of KI. After a 20 minute hold, a final growth segment was performed by the 8 minute addition of 14 mL/min of SOLN-1, with the simultaneous addition of the 4 M NaCl solution to maintain the pCl at 2.2. At the conclusion of grain growth the emulsion was washed and concentrated.

The resulting high chloride {100} tabular grain emulsion exhibited a mean grain ECD of 0.56 $\mu$m and a mean grain thickness of 0.09 $\mu$m. Tabular grains accounted for greater than 70 percent of the total grain projected area. The halide content of the grains was 0.6 mole percent iodide and 99.4 percent chloride, based on total silver.

Separate portions (E2-R, E2-G and E2-B)of this emulsion were sensitized to red, green, or blue light, respectively. E2-G was prepared by adding SS-4 and SS-5 in a 6:1 molar ratio to sensitize the emulsion to green light. E2-B was prepared by adding SS-6 and SS-7 in a 4:1 ratio to sensitize the emulsion to blue light, and E2-R was prepared by adding SS-8 and SS-9 in a 1:9 molar ratio to sensitize the emulsion to red light. These three emulsions were each optimally sulfur and gold sensitized using potassium tetrachloroaurate (III) and sodium thiosulfate. A panchromatically sensitive emulsion mixture, E2-PAN was prepared by mixing E2-R, E2-G and E2-B in a 1:1:1 molar ratio. Cyan, magenta, and yellow dye-forming couplers C-2, C-1, and C-3 were mixed in a 1.4:2:1 weight ratio to form a coupler mixture C-N providing a neutral tone.

A photothermographic coating was prepared which on a one square meter basis contained 1.32 g of silver from E2-PAN, 1.9 g of C-N, 1.3 g of silver from silver 3-amino-5-benzylmercapto-1,2,4-triazole, 1.3 g of DEV-1, 0.32 g of sodium sulfite, and 12.92 g of gelatin. This coating composition consisted of four separate layers each containing 3.23 g of gelatin: two identical layers which contained DEV-1 and sodium sulfite and two identical panchromatically sensitized layers which contained the other components.

A portion of this coating was cut into a 35 mm strip, perforated, and rolled into a film canister which was used to load a NIMSLO™ quadra lens camera. This camera is designed to accept 100 or 400 speed film, and is equipped with a light meter. Each lens exposes a 17.5×23 mm frame (~½ of a standard 35 mm). One of the four lenses of this camera was covered with a blue (Wratten™ WR47B) filter, another with a green (Wratten™ WR58) filter, and a third with a red (Wratten™ WR25) filter, and the fourth lens was left uncovered. For each scene which was photographed a series of three color separation exposures and one neutral exposure were obtained on the photothermographic coating.

One scene contained a Macbeth chart to allow an objective 2 0 evaluation of color reproduction. Macbeth charts are described by Stroebel, Compton, Current and Zakia, *Photographic Materials and Processes*, Focal Press, 1986, pp. 541 and 542.

The coating was heat-processed for 2 seconds at 130° C. The color separation negatives were scanned as grayscale images using a Nikon LS-1000™ film scanner. The silver halide grains remained in the film during scanning. Using Adobe Photoshop 3.0 software, the three scanned images were registered and cropped to the same image size. These three scanned images were integrated into a single full color image using the 'merge channels' function of Adobe Photoshop™ 3.0 and printed with a Kodak DS8650™ thermal printer.

High quality color images were obtained, with the colors in the original scenes faithfully reproduced in the final print.

Example 4 (comparative)

In this example, the film components used in Example 3 were coated as a conventional photothermographic multilayer element having superimposed blue, green and red recording layer units. Instead of using the panchromatically sensitized emulsion mixture with the mixture of cyan, magenta and yellow dye-forming couplers, the red-sensitized emulsion and cyan dye-forming coupler was confined to one layer unit, the green-sensitized emulsion and magenta dye-forming coupler were confined to a second layer unit, and the blue-sensitized emulsion and yellow dye-forming coupler were confined to a third layer unit.

This film was used to photograph a Macbeth chart. The film was heat processed, scanned, and the resulting color image was printed with a thermal printer. The image obtained was less colorful (blue, green and red color patch densities were less) than the image described in Example 3.

Example 4 (comparative)

A heat developable multilayer composition was prepared which contained six layers as shown in Table IV. The coverage of silver-containing components in Table IV are based on the weight of silver.

TABLE IV

| Layer | Name of layer | Ingredients | Coverage (g/m$^2$) |
|---|---|---|---|
| 6 | Overcoat | gelatin | 2.7 |
| | | surfactant S-1 | 0.06 |
| 5 | blue sensitive layer | blue-sensitive emulsion E2-B | 0.54 |
| | | gelatin | 4.3 |
| | | silver 3-amino-5-benzylmercapto-1,2,4-triazole | 0.65 |
| | | yellow dye-forming coupler C-3 | 0.86 |
| | | surfactant S-1 | 0.08 |
| 4 | interlayer | DEV-1 | 0.65 |
| | | sodium sulfite | 0.16 |
| | | gelatin | 2.7 |
| | | surfactant S-1 | 0.06 |
| 3 | green sensitive layer | green-sensitive emulsion E2-G | 0.54 |
| | | gelatin | 4.3 |
| | | silver 3-amino-5-benzylmercapto-1,2,4-triazole | 0.65 |
| | | magenta dye-forming coupler C-1 | 0.86 |
| | | surfactant S-1 | 0.08 |
| 2 | interlayer | DEV-1 | 0.65 |
| | | sodium sulfite | 0.16 |
| | | gelatin | 2.7 |
| | | surfactant S-1 | 0.06 |
| 1 | red sensitive layer | red-sensitive emulsion E2-R | 0.54 |
| | | gelatin | 4.3 |
| | | silver 3-amino-5-benzylmercapto-1,2,4-triazole | 0.65 |
| | | cyan dye-forming coupler C-2 | 0.86 |
| | | surfactant S-1 | 0.08 |
| transparent support | | | |

A portion of this coating was cut into a 35 mm strip, perforated, and rolled into a film canister which was used in a camera to photograph a scene containing a Macbeth chart.

The coating was heat-processed for 2 seconds at 130° C. The negative was scanned as a color image using a Nikon LS-1000™ film scanner. The silver halide grains remained in the film during scanning. This scanned image was printed with a Kodak DS8650™ thermal printer.

To quantitatively compare the degree of color saturation in the color images obtained in Examples 3 and 4, the saturation values for the 18 color patches of the Macbeth chart were obtained using the HSB color model supported by Adobe Photoshop. These results are summarized in Table V, where larger numbers reflect a greater degree of color saturation. It is apparent that the color saturation for the color images obtained by recombining the color separation images in Example 3 was superior overall to that of the color images obtained using the multilayer structure described in Example 4.

TABLE V

| | Color saturation | |
|---|---|---|
| Color Patch | Example 3 (invention) | Example 4 (comparison) |
| Cyan | 90 | 39 |
| Magenta | 79 | 27 |
| Yellow | 56 | 17 |
| Red | 90 | 52 |
| Green | 79 | 50 |
| Blue | 56 | 70 |
| Orange | 91 | 25 |
| Purplish Blue | 48 | 44 |
| Moderate Red | 76 | 36 |
| Purple | 45 | 52 |
| Yellow Green | 85 | 21 |
| Orange Yellow | 85 | 16 |
| Dark Skin | 75 | 58 |
| Light Skin | 55 | 15 |
| Blue Sky | 38 | 29 |
| Foliage | 68 | 52 |
| Blue Flower | 16 | 14 |
| Bluish Green | 21 | 15 |

Color inaccuracy (CI) was determined by the following equation: (I)

$$CI=[L^*_i+a^*_i+b^*_i]^{1/2}$$

where

CI color inaccuracy;

$L^*_i$=L* inaccuracy;

$a^*_i$=a* inaccuracy; and $b^*_i$=b* inaccuracy.

The inaccuracy in L*, a* and b* values were determined as the difference between the value read directly from a Macbeth chart color patch ($L^*_m$ or $a^*_m$ or $b^*_m$) and the value read from the photothermographic element image ($L^*_{pt}$ or $a^*_{pt}$ or $b^*_{pt}$) of the same Macbeth chart color patch, with the difference divided by the Macbeth chart color patch value ($L^*_m$ or $a^*_m$ or $b^*_m$)

L*, a* and b* values are quantifications of CIE(1976) L*a*b* color space. L* values are a quantification along a luminance axis; a* values are quantifications along a red-green color axis; and b* values are quantifications along a yellow-blue axis. CIE1976(L*a*b*) color space quantification is one of several color space quantifications originated from the Commission Internationale de l'Eclairage. A more detailed description of CIE1976(L*a*b*) color space is found in G. Wyszecki & W. S. Stiles, *Color Science, Concepts and Methods, Quantitative Data and Formulae*, J. Wiley & Sons, N.Y.(1982), particularly pp. 143–145, 166–169 and 829; R. W. G. Hunt, *The Reproductions of Color in Photography, Printing, and Television*, Fountain Press, Tolworth, England, 1987, Chapter 8, Colour Standards and Calculations, pp. 104–130; R. W. G. Hunt, *Measuring Colour*, John Wiley and Sons, p. 66; and Grum and Bartleson, *Optical Radiations Measurements*, Vol. 2, *Color Measurement*, Academic Press, 1980, p. 129.

The color inaccuracy results are summarized in Table VI, where a lower value indicates higher color accuracy. It is apparent from the data in Table VI, that overall superior color accuracy was obtained for the color images obtained in Example 3.

TABLE VI

| | CI | |
|---|---|---|
| Color Patch | Example 3 (invention) | Example 4 (comparison) |
| Cyan | 1.38 | 1.98 |
| Magenta | 1.12 | 2.51 |
| Yellow | 0.399 | 0.868 |
| Red | 0.385 | 0.675 |
| Green | 0.335 | 0.323 |
| Blue | 1.11 | 2.89 |
| Orange | 0.504 | 1.29 |
| Purplish Blue | 1.69 | 3.093 |
| Moderate Red | 0.910 | 0.875 |
| Purple | 0.811 | 2.46 |
| Yellow Green | 0.298 | 0.993 |
| Orange Yellow | 0.821 | 1.675 |
| Dark Skin | 0.485 | 0.880 |
| Light Skin | 0.704 | 1.28 |
| Blue Sky | 7.07 | 11.1 |
| Foliage | 0.313 | 0.625 |
| Blue Flower | 1.02 | 2.17 |
| Bluish Green | 12.0 | 6.03 |

The invention has been described in detail with particular reference to preferred embodiments thereof, but it will be understood that variations and modifications can be effected within the spirit and scope of the invention.

What is claimed is:

1. A method of creating a color image of a photographic subject comprising mounting in a camera a photothermographic film comprised of a support and a photographically responsive, thermally developable panchromatically sensitized emulsion layer unit containing radiation-sensitive silver halide grains, at least 50 percent of the grains on a projected area basis being accounted for by tabular grains, a plurality of spectral sensitizing dyes adsorbed to the surface of the radiation-sensitive silver halide grains chosen to provide light sensitivity in the blue, green and red portions of the spectrum, a light-insensitive, reducible source of silver, a development component capable of providing a dye image, and a hydrophilic colloid vehicle, exposing the emulsion layer unit in a first image capture area to blue light received from the photographic subject to create a latent image of blue light exposure, exposing the emulsion layer unit in a second image capture area to green light received from the photographic subject to create a latent image of green light exposure, exposing the emulsion layer unit in a third image capture area to red light received from the photographic subject to create a latent image of red light exposure, thermally processing the photothermographic clement to produce images of the same hue in each of the first, second and third image capture areas, converting each of the images of blue, green and red light exposures into a corresponding additive or subtractive primary hue, and integrating the primary hue images to provide a positive or negative color image of the photographic subject.

2. A method according to claim 1 wherein the first, second and third image capture areas are simultaneously exposed.

3. A method according to claim 1 wherein the first, second and third image capture areas are exposed through different lenses of the same camera.

4. A method according to claim 1 wherein the first, second and third image capture areas are exposed by dividing light from a single camera lens.

5. A method according to claim 1 wherein the emulsion layer unit is additionally exposed in a fourth image capture area to blue, green and red light from the photographic subject to create a latent image corresponding to total blue, green and red light exposure.

6. A method according to claim 1 wherein image information is retrieved from the first, second and third image capture areas by scanning and the scanned information is stored in a digital computer.

7. A method according to claim 5 wherein image information is retrieved from the first, second, third and four image capture areas by scanning, the information retrieved by scanning is stored in a digital computer, and the stored information from the first, second and third image capture is recombined for viewing using information from the fourth image capture area for density calibration.

* * * * *